United States Patent
Brown et al.

(10) Patent No.: US 6,692,659 B2
(45) Date of Patent: Feb. 17, 2004

(54) PHOSPORESCENT POLYCARBONATE, CONCENTRATE AND MOLDED ARTICLES

(75) Inventors: Michael W. Brown, Mt. Vernon, IN (US); David Rosendale, Mt. Vernon, IN (US); Philippe Schottland, Evansville, IN (US)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 10/160,762

(22) Filed: May 31, 2002

(65) Prior Publication Data

US 2003/0227003 A1 Dec. 11, 2003

(51) Int. Cl.⁷ .................................................. C09K 11/02
(52) U.S. Cl. .................................. 252/301.36; 524/786
(58) Field of Search ....................... 252/301.36; 524/786

(56) References Cited

U.S. PATENT DOCUMENTS

| | | |
|---|---|---|
| 2,465,319 A | 3/1949 | Whinfield et al. |
| 3,047,539 A | 7/1962 | Pengilly |
| 4,217,438 A | 8/1980 | Brunelle et al. |
| 5,424,006 A | 6/1995 | Murayama et al. |
| 5,530,083 A | 6/1996 | Phelps et al. |
| 5,607,621 A * | 3/1997 | Ishihara et al. ......... 252/301.36 |
| 5,976,411 A * | 11/1999 | Feng et al. ............. 252/301.35 |
| 6,375,864 B1 * | 4/2002 | Phillips et al. ......... 252/301.33 |

FOREIGN PATENT DOCUMENTS

| | | |
|---|---|---|
| JP | 2000034414 | 2/2000 |
| WO | WO 00/27908 | 5/2000 |

OTHER PUBLICATIONS

U.S. patent application Ser. No. 09/922,624, filed Aug. 6, 2001, "Phosphorescent Polycarbonate and Moled Articles".

* cited by examiner

Primary Examiner—C. Melissa Koslow

(57) ABSTRACT

Thermoplastic composition comprising a thermoplastic resin and a phosphorescent pigment with a aluminate matrix expressed by M—Al in which M is at least one metal element selected from calcium, strontium and barium and Al represents an aluminate group, wherein the pigment has been coated with a silicone oil.

Objects formed by injection molding of the thermoplastic resin compositions. The compositions of the invention exhibit improved melt flow stability and suffer less from graying upon compounding them in an extruder.

16 Claims, No Drawings

PHOSPORESCENT POLYCARBONATE, CONCENTRATE AND MOLDED ARTICLES

BACKGROUND OF THE INVENTION

The invention relates to thermoplastic compositions comprising a thermoplastic resin and a phosphorescent pigment with an aluminate matrix expressed by M—Al, in which M is at least one metal element selected from calcium, strontium and barium and Al represents an aluminate group.

The thermoplastic compositions can comprise a blend of thermoplastic resins. The compositions of the invention are particularly suitable for injection molding processes and film/sheet extrusion. The invention also relates to concentrates suitable for making the compositions of the invention and to objects obtained by injection molding or extrusion of the compositions according to the invention.

Phosphorescent compounds with an aluminate matrix are well known. U.S. Pat. No. 5,424,006 describes this type of phosphorescent pigments and refers to the possibility to mix them into a plastic material.

U.S. Pat. No. 5,607,621 describes phosphorescent synthetic resin materials comprising about 5 to about 20% by weight of similar aluminate based phosphorescent pigments and a synthetic resin. Many synthetic resins are mentioned by way of example.

U.S. Pat. No. 5,976,411 describes molded, extruded or formed phosphorescent plastic articles made out of a plastic composition comprising a thermoplastic or a thermosetting resin, about 1% to about 50% by weight of a phosphorescent pigment and about 0.001% to about 20% by weight of a laser energy absorbing additive.

U.S. Pat. No. B1-6,375,864 describes compositions and molded, extruded or formed phosphorescent plastic articles produced therefrom comprising phosphorescent phosphor pigments preferably in combination with polymer-soluble daylight fluorescent dyes.

JP-A-12-034 414 describes semitransparent light-storing resins which contain in total 1–4% by weight of a light storing phosphorescent pigment. Strontium aluminates are used in the examples of this Japanese patent application. According to JP-A-12-034 414 it was common to use phosphorescent pigments with a very wide range of particle sizes varying from several tens micrometers to hundreds of micrometers and an average particle size of about 10–20 micrometers. JP-A-12-034 414 seeks to improve the balance of relative density of residual luminescence and the light transmission of the known compositions by using phosphorescent pigments with a particular particle size.

The aluminate particles suitable for use in the compositions of the invention are very hard and might cause wear of the screws in injection molding and extrusion machinery. In general, the aluminate particles can cause enough wear to remove the carbon build-up on the screws thus leading to graying of the composition processed with the screws.

It is desirable to find phosphorescent pigments that cause less graying and that can be used in smaller quantities to get the same optical effect as obtained with larger quantities of previously used pigments.

U.S. patent application Ser. No. 09/922,624 filed on Aug. 6, 2001, describes transparent or translucent thermoplastic compositions comprising a thermoplastic polycarbonate resin and a phosphorescent pigment (phosphor). The phosphor is present in a quantity of 0.01 to 2.0% by weight. The phosphor should have a median particle size of less than 10 micrometer. It is stated that graying of the composition can be minimized by selecting this particle size.

SUMMARY OF THE INVENTION

It has now be found that by incorporating phosphorescent pigments which have been coated with a silicone oil in thermoplastic resins it is possible to get less graying of the composition of the invention when processed with the screws of injection molding machines.

The invention deals with thermoplastic compositions comprising a thermoplastic resin and a phosphorescent pigment with an aluminate matrix expressed by M—Al in which M is at least one metal element selected from calcium, strontium and barium and Al is an aluminate group, wherein the phosphorescent pigment has been coated with a silicone oil.

The thermoplastic compositions of the invention are preferably transparent or translucent to get an optimal optical effect.

It is possible to use aluminate phosphorescent pigments that have been doped with Europium.

It is also possible to use aluminate phosphorescent pigments that have been doped with Europium and at least one co-dopant like Dysprosium.

Objects formed by injection molding or extrusion of thermoplastic composition of any of the compositions of the invention also form part of the invention.

DETAILED DESCRIPTION OF THE INVENTION

The processing of long afterglow phosphorescent pigments in polycarbonate is usually a very complex task. Since the hardness of these pigments is generally very high, extruder screws are "scrubbed" during compounding or even during the injection-molding process. This results in graying of the resin and/or the final part. A solution to this problem is to feed the pigment downstream during the extrusion. Unfortunately, although this decreases the graying issue, it does not eliminate the problem. An alternate solution is to use extremely fine pigments (maximum particle size below about 10 microns). This technique has proven useful for the further reduction of the graying issues. Downstream feeding of the pigments is the preferred method of addition of phosphorescent pigments (in powder form or dispersed in a masterbatch). Downstream feeding is not even required when extremely fine pigments are used and even a single screw extruder can compound the complete resin formulation. However, it is well known to those skilled in the art that the large phosphorescent pigment particles exhibit by far the brightest and most durable glow before being compounded in the thermoplastic resin. But it is also a well-established fact that these large particles are creating the most visible graying issues even when fed downstream during the extrusion process.

It has now been found that the graying can be minimized by using the compositions of the invention.
A. One or more thermoplastic resins and
B. a phosphorescent pigment with an aluminate matrix expressed by M—Al, in which M is at least one metal element selected from calcium, strontium and barium and Al represents an aluminate group, wherein the phosphorescent has been coated with a silicone oil.

The use of the coated pigments of the invention gives additional benefits: the moisture sensitivity of the pigments is reduced and the polymer matrix will less easily react with the pigments which sometimes can affect the properties of the thermoplastic resins.

The invention also claims thermoplastic compositions wherein the phosphorescent pigment has been coated with two different subsequently applied silicone oils. The phosphorescent pigment can have a first coating comprising a hydrogen-alkyl siloxane oil and a second coating comprising a poly dialkyl siloxane oil. The order of the coating may also be reversed. These coating steps are performed prior to compounding.

The coating is usually present in a quantity of about 0.05 to 20, more preferably 0.1 to 10 or most preferred of about 0.5 to 5% by weight with respect to the phosphorescent pigment.

The thermoplastic composition of the invention can comprise colorants that have been added to provide daylight color.

The thermoplastic compositions of the invention may comprise per 100 parts by weight of thermoplastic resin or resins 0.1 to 40, preferably 0.1 to 30, and even more preferably 0.1 to 10 parts by weight of the phosphorescent pigment.

The invention also deals with concentrates suitable for the manufacture of the thermoplastic composition of the invention. The concentrates may comprise per 100 parts by weight thermoplastic resin or resins 5–50 parts by weight of the phosphorescent pigment.

The resin compositions of the invention could appear transparent, translucent or opaque. As known by those skilled in the art, appearance depends on the exact nature and used quantities of the components of the compositions of this invention.

The thermoplastic compositions of the invention are preferably used for forming objects by injection molding. This patent also claims objects formed by injection molding of the thermoplastic compositions of the invention. Thermoplastic compositions of the invention may also be used in extruded products such as sheets or films.

Suitable thermoplastic resins for the compositions of the invention are for example polycarbonates or blends of other thermoplastic polymers with polycarbonates.
Polycarbonates.

As used herein, the term "polycarbonate" includes polymers having structural units of the formula (I):

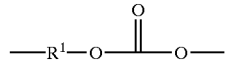

(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

$$—A^1—Y^1—A^2—$$  (II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being biphenol (OH-benzene-benzene-OH). The bridging radical $Y^1$ can be a hydrocarbon group or a saturated hydrocarbon group such as methylene, cyclohexylidene or isopropylidene.

Polycarbonates can be produced by the reaction of dihydroxy compounds in which only one atom separates $A^1$ and $A^2$. As used herein, the term "dihydroxy compound" includes, for example, bisphenol compounds having general formula (III) as follows:

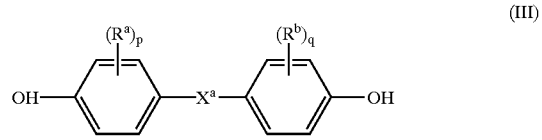

(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

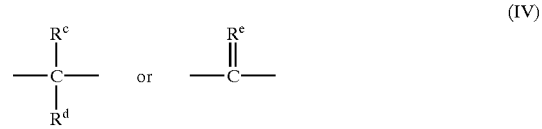

(IV)

wherein $R^c$ and $R^d$ each independently represent a hydrogen atom or a monovalent linear or cyclic hydrocarbon group, and $R^e$ is a divalent hydrocarbon group.

Some illustrative, non-limiting examples of suitable dihydroxy compounds include dihydric phenols and the dihydroxy-substituted aromatic hydrocarbons such as those disclosed by name or formula (generic or specific) in U.S. Pat. No. 4,217,438,. A nonexclusive list of specific examples of the types of bisphenol compounds that may be represented by formula (III) includes the following: 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis (hydroxyaryl) alkanes such as 2,2-bis(4-hydroxy-3-bromophenyl) propane; 1,1-bis(4-hydroxyphenyl) cyclopentane; 4,4'-biphenol ;and bis(hydroxyaryl) cycloalkanes such as 1,1-bis(4-hydroxyphenyl) cyclohexane; and the like as well as combinations comprising at least one of the foregoing bisphenol compound.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecandioic acid.

Suitable polymers that may be incorporated in the compositions of the invention comprising polycarbonate resins are for example silicone polycarbonate block copolymers and cycloaliphatic polyester resins.

Suitable silicone polycarbonate block copolymers have from about 0.5% to about 80% by weight of chemically combined polydiorganosiloxane units with an average block length of about 10 to about 100 chemically combined diorganosiloxy units. They can be prepared such as described for example in U.S. Pat. No. 5,530,083.

Suitable cycloaliphatic polyester resins are the resins comprising the reaction product of an aliphatic $C_2$–$C_{12}$ diol or chemical equivalent and a $C_6$–$C_{12}$ aliphatic diacid or chemical equivalent, said cycloaliphatic polyester resin containing at least about 80% by weight of a cycloaliphatic dicarboxylic acid, or chemical equivalent, and/or of a cycloaliphatic diol or chemical equivalent.

The preferred polyester molecules are derived from cycloaliphatic diol and cycloaliphatic diacid compounds, specifically polycyclohexane dimethanol cyclohexyl dicarboxylate. The polyester having only one cyclic unit may also be useful. The most preferred polyester has both cycloaliphatic diacid and cycloaliphatic diol components such as polycyclohexane dimethanol cyclohexyl dicarboxylate.

Phosphorescent Pigment with an Aluminate Matrix and Aesthetic Effects Obtained by the Pigments.

The articles molded out of the compositions of the invention are phosphorescent. Fluorescence and phosphorescence are very similar phenomena on a molecular scale. They occur when a substance absorbs radiation of a certain wavelength and re-emits photons of different wavelength. Typically, the emission of phosphorescence takes place in more than $10^{-4}$ seconds (and may last for minutes or hours) while fluorescence is an extremely brief phenomenon lasting between $10^{-4}$ and $10^{-9}$ seconds. When a phosphorescent or fluorescent molecule absorbs light, electrons are excited to a higher vibrational energy state. The molecule then loses its excess of vibrational energy by collisions and internal energy conversions and falls to the lowest vibrational level of the first excited state. From this level, the molecule can return to any of the vibrational levels of the ground state, emitting its energy in the form of fluorescence.

Long afterglow phosphorescent pigments typically absorb light between 200 and 450 nm. As a result, the light source having the most important UV contribution will be the most efficient to activate the phosphorescent formulations. Illuminant D65 (6500K light source) is an excellent reproduction of daylight including the UV range. After ten minutes of D65 illumination in a MacBeth light booth, the color chips molded from the thermoplastic resin composition of the invention exhibit a strong initial glow that decreases exponentially over several hours. It is noteworthy that wit transparent or translucent resin compositions of this invention, the emission may be noticeably stronger on the edge of the chip because the polycarbonate acts as a wave-guide thus creating an "edge glow" effect. The edge glow effect adds an interesting potential in terms of design because it allows for example the realization of accent features in molded parts. The amount of edge glow effect can be reduced by addition of a light scattering agent which is typically—but not limited to—titanium dioxide, zinc oxide, or teflon. The scattering agent will not only make the part glow more homogeneously at night, but also give more possibilities in terms of colorability. Bright colors (like blue, yellow, green, violet, light red and orange) have been obtained and, despite the presence of colorants, exhibit a glow performance similar or better than formulations not containing the scattering agent.

It must be noted that some phosphorescent pigments can be efficiently activated by a light source without UV energy. These pigments are indeed quickly activated by indoor light like cool white fluorescent light. They are a preferred embodiment when used in combination with light scattering agents like titanium dioxide and other colorants. Another important application of these special pigments is in formulations containing UV stabilizers because the stabilizer screens the UV energy and therefore does not allow usual phosphorescent pigments to be quickly and efficiently activated.

The chemical structure of suitable phosphorescent pigments with an aluminate matrix have been described in the above mentioned patents, in particular in U.S. Pat. No. 5,424,006. It is preferred to use phosphorescent pigments which have been doped with Europium and even more preferably with Europium and at least one co-dopant.

They are commercially available in different particles sizes from Nemoto & Co and Honeywell.

The preferred phosphorescent pigments as used in the thermoplastic compositions of this invention should have a median particle size of less than ten (10) micrometer. The median particle size is sometimes indicated as D50-value. It can be measured with a commonly known laser diffraction method, more accurately called low angle light scattering (LALLS). A general description of this method can be found for example in ISO 13320, a new international standard relating to particle size analysis by laser diffraction.

Other Components of the Compositions of the Invention.

The compositions of the invention may comprise further additives like anti-oxidants, mold release agents, flame retarding agents, or any combination of colorants to achieve the desired aesthetic look under day light and UV stabilizers. It is also possible to incorporate scattering agents like titanium dioxide in the compositions of the invention.

Objects Made out of the Compositions of the Invention.

Objects made out of the compositions of the invention can be used for instance, in applications such as business equipment, computers and peripherals, consumer electronics, telecom (cell phones, personal data assistants, wireless devices), in the automotive industry (knobs, dashboards and reflectors), and helmets where the physical properties of polycarbonate are needed and a glow-in-the-dark effect is desired for aesthetic purposes. Another application would be in optical media and especially the non-information side (disk half that is not traversed by the reading laser) of optical disks like DVD-5 and DVD-9.

Objects also include signs such as EXIT signs or other luminescent displays formed by extrusion or injection molding.

Processes for Preparation of the Compositions of the Invention.

The phosphorescent pigment is coated using at least one type of silicone oil and in a most preferred embodiment of this invention two different oils. The silicone oils are polysiloxane polymers that could bear functional groups such as—but not limited to—alkyl, alkoxy, alcohol, allyl, vinyl, or alcoyl. Most common examples of silicone oils are polymethylhydrosiloxane, and polydimethylsiloxane, polymethylethylsiloxane, etc . . . In a preferred embodiment, the phosphorescent pigment will be coated using, as a first coating agent, a polymethylhydrosiloxane (commercially sold by GE Silicones as DF-1040). The polymethylhydrosiloxane can bond effectively to the pigment surface by hydrosilylation and gives an efficient protection. However, the presence of unreacted Si—H bonds increases the probability of formation of aggregates. These aggregates are not desirable because they can create some feeding problems in manufacturing or simply cause a lumping of the pigment thus making the use of the material very unpractical. To avoid such issues, a second silicone coating is applied. In order to have anti-dusting properties as well as make the overall coating more water impervious, polydimethylsiloxane (commercially sold by GE Silicones as DF-581) is a preferred second silicone coating, which is deposited on top of the first coating.

Depending on the process of applying the silicone coating, the sequence in which the silicone coatings are applied may vary. For instance, it has been shown that when a tumble/blending piece of equipment is used to apply the coatings, it is preferable to apply the polydimethylsiloxane first then followed by the polymethylhydrosiloxane. The better coating efficiency in this case has been shown by the floatability of the pigment in water, which indicates that the pigment is more protected thus forming a material less likely to react with the resin during compounding.

The amount of silicone oil used for the coating depends on the efficiency of the application process. A traditional wet blending method has proven very inefficient and creates variability in the final coating. In other words, some pigments will be over-coated while others will not be coated at all. The preferred application method is a spraying of the silicon oil and in a most preferred embodiment, a spraying of the oil in a fluidized bed reactor. For optimum performance of the pigment, the total amount of silicone oil should be between 0.05 and 20 weight percent, with 0.1 to 10% preferred and 0.5 to 5% even more preferred. When two silicone coatings are used, such as polymethylhydrosiloxane and polydimethylsiloxane, the total amount should still be between 0.05 and 20 weight percent, with 0.1 to 10% preferred and 0.5 to 5% even more preferred. However, the split ratio between the two oils can be between 1:99 to 99:1 depending on the type of protection being sought. In a most preferred embodiment, the first coating represents at least about 50% of the total silicone content.

The final coated pigment can then be used in polycarbonate or any other thermoplastic resin formulation. During the extrusion process, the coated pigment can be added upstream or downstream using a side feeder. The pigment can be added to the melt alone or blended with resin powder for easier addition. Although it is not the most preferred process, the coated pigments can also be added directly to a blender and mixed with resin powder. It is well known to those skilled in the art that the later technique is not the most suitable to achieve good color consistency during the entire extrusion process. However, the advantage of the coated pigment in this case is the reduction of the contacts between the abrasive pigment and the walls or the mixing elements, which reduces the grayness issues in the final product and therefore leads to brighter phosphorescence.

After extrusion and pelletization, the resin can be molded into parts and exhibits a significantly cleaner appearance and a brighter glow compared to non-coated pigment of the same size. The cleaner appearance can be measured using the color coordinates (CIELAB system) and more specifically L* which relates to lightness and darkness. The glow performance of the obtained phosphorescent plastic part (e.g. color chip) can be measured using a luminance meter attached to a fixture that isolates the sample from ambient light. As shown in example I below, a formulation containing about 5% silicone-coated phosphorescent pigment yields a plastic part that is more than 6 ☐L* units lighter (i.e. less dark) when measured in reflectance using a spectrophotometer. In terms of glow, a 5.08 cm×7.62 cm chip with a thickness of 2.54 mm molded with the coated pigment as described in example I will exhibit a glow about 30% brighter than the formulation made with non-coated pigment after 200 second.

In conclusion, when a rare earth aluminate phosphorescent pigment is coated according to our invention, significant improvements in visual appearance as well as in glow performance of a molded part are achieved. Due to the exponential nature of the phosphorescence decay, a result of a brighter glow is that the plastic part will be visible to the human eye for a longer period of time. This is obviously critical in safety applications such as luminescent trunk release handles or exit signs. The compositions of the present invention can be molded by conventional molding processes into objects. The preferred molding processes are by injection molding, by blow molding and by film/sheet extrusion. Most preferred is the molding by injection molding.

EXAMPLES

All Luminova phosphorescent pigments used in the following examples have an aluminate matrix expressed by $MAl_2O_4$ in which M is at least one metal element selected from calcium, strontium and barium.

Example 1

In the formulation described herebelow (formulation 1B), a commercially available long afterglow phosphorescent pigment with a large particle size has been used i.e. Luminova G300M (median particle size of about 20 $\mu$m). The phosphorescent pigment has been coated according to this invention with a dual coating of polymethylhydrosiloxane and polydimethylsiloxane (respectively GE Silicones DF-1040 and DF-581). Each oil was added to the pigment at an amount of 5% per weight of pigment and dispersed using a high-speed mixer. The coated pigment has been blended with poly(bisphenol-A carbonate) resin powder with an average molecular weight (Mw) of 29,900 at a 1:1 ratio. The resin/pigment blend was then fed to the extruder using a downstream feeder ("side stuffer") to limit the contact between the pigment and the screw/barrel. High flow polycarbonate resin was fed through the feed throat of the extruder at the same time at a ratio of 10:1 in order to achieve a 5 weight percent loading of pigment in the extruded product. Extrusion was performed at a melt temperature of 290° C. and the resin strands were pelletized after cool down in a water bath.

In Formulation 1A, the same pigment was used but not coated according to the invention. Extrusion conditions remained the same in order to obtain a 5 weight percent loading of pigment in the pelletized material. Color chips (5.08 cm×7.62 cm, thickness: 2.54 mm) were molded for each formulation. Color values (CIE Lab color space) were measured on the chips in reflectance mode (white tile backing) using a MacBeth 7000A spectrophotometer under a D65 illuminant and a 10 degree observer. The glow performance of the two formulations was measured using a Minolta LS-100 Luminance meter coupled to a customized dark box preventing external light to interfere with the measurement. The color chips (5.08×7.62 cm/thickness 2.54 mm) were previously placed in the dark for 24 hours to fully discharge the phosphorescent pigments. They were subsequently exposed to simulated daylight (D65 at 1000 lux intensity) for 15 minutes in a MacBeth Spectralight III light booth and the phosphorescence decay was measured using the Minolta luminance meter in the customized fixture.

A polycarbonate resin composition (IA) was prepared by mixing:
  100 parts of poly(bisphenol-A carbonate) with an average molecular weight (Mw) of 21,900
  0.06 parts of tris(2,4-di-tert-butylphenyl) phosphite
  0.27 parts of pentaerythritol tetrastearate 5 parts of Luminova G300M used as received from the supplier A polycarbonate resin composition (IB) was prepared by mixing:
- 100 parts of poly(bisphenol-A carbonate) with an average molecular weight (Mw) of 21,900
- 0.06 parts of tris(2,4-di-tert-butylphenyl) phosphite
- 0.27 parts of pentaerythritol tetrastearate
- 5 parts of Luminova G300M previously coated according to the invention with 5% of GE Silicones DF-1040 (polymethylhydrosiloxane) and 5% of GE Silicones DF-581 (polydimethylsiloxane).

The color coordinates and the glow performance are summarized in Table 1. As a result of the coating process described in this invention, the parts have a greater L* value (lightness of the color) under daylight as well as almost 50% more luminance in the dark. In other words, when the coating process described in this invention is used, the parts look not only cleaner but they also exhibit brighter phosphorescence.

TABLE 1

| Properties | Formulation 1A | Formulation 1B |
|---|---|---|
| CIELAB (Reflect./ D65 / 10° ) L* | 69.70 | 76.22 |
| CIELAB (Reflect./ D65 / 10° ) a* | −1.25 | −4.14 |
| CIELAB (Reflect./ D65 / 10° ) b* | 11.81 | 12.84 |
| Luminance after 100 seconds (mCd/m$^2$) | 130 | 193 |
| Luminance after 200 seconds (mCd/m$^2$) | 75 | 110 |

Example 2

In the formulations described herebelow, a commercially available long afterglow phosphorescent pigment with a relatively small particle size has been used i.e. Luminova GLL300FFS (median particle size of about 2 microns, maximum particle size of about 6 microns). In the case of formulations 2B and 2C, the phosphorescent pigment has been coated according to this invention with a dual coating of polymethylhydrosiloxane and polydimethylsiloxane (respectively GE Silicones DF-1040 and DF-581) with the polydimethylsiloxane applied first. Each oil was added to the pigment at an amount of 1% (formulation 2B) or 2% (formulation 2C) per weight of pigment and dispersed using a mechanical blender. In the case of formulation 2A, the pigment was used as received. The pigment was then tumble blended with poly(bisphenol-A carbonate) resin powder with an average molecular weight (Mw) of 29,900, a phosphite stabilizer and a mold release agent. The resin composition was then fed through the feed throat of a single screw extruder. Extrusion was performed at a melt temperature of 290° C. and the resin strands were pelletized after cool down in a water bath.

Color chips (5.08×7.62 cm/thickness 2.54 mm) as well as test parts (Notched Izod bars) were molded for each formulation. Melt flow characteristics (melt volume rate) were analyzed according to ASTM D1238 on resin pellets after 6 minutes (MVR 6) and 18 minutes (MVR 18) of dwell time at 300° C., as well as on molded color chips (MVR part).

A polycarbonate resin composition (2A) was prepared by mixing:
- 100 parts of poly(bisphenol-A carbonate) with an average molecular weight (Mw) of 29,900
- 0.06 parts of tris(2,4-di-tert-butylphenyl) phosphite
- 0.27 parts of pentaerythritol tetrastearate
- 6 parts of Luminova GLL-300FFS was used as received from the supplier A polycarbonate resin composition (2B) was prepared by mixing:
- 100 parts of poly(bisphenol-A carbonate) with an average molecular weight (Mw) of 29,900
- 0.06 parts of tris(2,4-di-tert-butylphenyl) phosphite
- 0.27 parts of pentaerythritol tetrastearate
- 6 parts of Luminova GLL-300FFS previously coated according to the invention with successively 1% of GE Silicones DF-581 (polydimethylsiloxane) and 1% of GE Silicones DF-1040 (polymethylhydrosiloxane).

A polycarbonate resin composition (2C) was prepared by mixing:
- 100 parts of poly(bisphenol-A carbonate) with an average molecular weight (Mw) of 29,900
- 0.06 parts of tris(2,4-di-tert-butylphenyl) phosphite
- 0.27 parts of pentaerythritol tetrastearate
- 6 parts of Luminova GLL-300FFS previously coated according to the invention with successively 2% of GE Silicones DF-581 (polydimethylsiloxane) and 2% of GE Silicones DF-1040 (polymethylhydrosiloxane).

The melt flow characteristics as well as the Notched Izod impact resistance are summarized in Table 2. When the coating process described in this invention is used, it appears clearly that the resin compositions formed have a much better melt stability (melt flow shift below 5%). It is also noteworthy that mechanical properties are significantly improved with the coated pigments. Molded objects would be completely brittle at room temperature without coating on the pigment whereas they exhibit full ductility and notched Izod impact resistance comparable to non-pigmented polycarbonate when the silicone coating process is used. This can be attributed to the fact that the non coated pigment shifted the nominal melt volume rate of the resin from about 7 to about 70 cm$^3$/10 minutes. This shift is usually an indication of the degradation of the polycarbonate chains which leads to loss of physical properties.

TABLE 2

| Property | Units | Method | 2A | 2B | 2C |
|---|---|---|---|---|---|
| N. Izod Impact (% ductility), 0.125" (3.2 mm), 23° C. | ft-lb/in [J/m] | ASTM D 256 | 2 (0%) [106] | 16 (100%) [850] | 16 (100%) [850] |
| N. Izod Impact (% ductility), 0.125" (3.2 mm), 0° C. | ft-lb/in [J/m] | ASTM D 256 | 2 (0%) [106] | 15 (100%) [795] | 15 (100%) [795] |
| Melt Volume Rate, 300° C., 1.2 kgf, 2.54 cm, 6 min. | cm$^3$/ 10 min | ASTM D 1238 | 66.63 | 6.96 | 6.48 |
| Melt Volume Rate, 300° C., 1.2 kgf, 2.54 cm, 18 min. | cm$^3$/ 10 min | ASTM D 1238 | 73.85 | 7.03 | 6.58 |
| Melt Volume Rate, 300° C., 1.2 kgf, 2.54 cm, part | cm$^3$/ 10 min | ASTM D 1238 | 68.99 | 7.43 | 6.75 |
| Melt Volume Rate shift (%) between 6 and 18 minutes | % | — | 10.8 | 1.0 | 1.5 |

Example 3

In the formulations described herebelow, a commercially available long afterglow phosphorescent pigment with a relatively small particle size has been used i.e. Luminova GLL300FFS (median particle size of about 2 microns, maximum particle size of about 6 microns). In the case of formulations 3A and 3B, the phosphorescent pigment has been coated according to this invention with a dual coating of polymethylhydrosiloxane and polydimethylsiloxane (respectively GE Silicones DF-1040 and DF-581) with the polydimethylsiloxane applied first. Each oil was added to the pigment at an amount of 1% (formulation 3A) or 2% (formulation 3B) per weight of pigment and dispersed using a mechanical blender. The coated pigment was then tumble blended with poly(bisphenol-A carbonate) resin powder with an average molecular weight (Mw) of 29,900, a phosphite stabilizer and a mold release agent. The resin composition was then fed through the feed throat of a single screw extruder. Extrusion was performed at a melt temperature of 290° C. and the resin strands were pelletized after cool down in a water bath.

Melt flow characteristics (melt volume rate) were analyzed according to ASTM D1238 on resin pellets after 6 minutes (MVR 6) and 18 minutes (MVR 18) of dwell time at 300° C.

A polycarbonate resin composition (3A) was prepared by mixing:

100 parts of poly(bisphenol-A carbonate) with an average molecular weight (Mw) of 29,900

0.06 parts of tris(2,4-di-tert-butylphenyl) phosphite 0.27 parts of pentaerythritol tetrastearate 30 parts of Luminova GLL-300FFS previously coated according to the invention with successively 1% of GE Silicones DF-581 (polydimethylsiloxane) and 1% of GE Silicones DF-1040 (polymethylhydrosiloxane).

A polycarbonate resin composition (3B) was prepared by mixing:

100 parts of poly(bisphenol-A carbonate) with an average molecular weight (Mw) of 29,900

0.06 parts of tris(2,4-di-tert-butylphenyl) phosphite 0.27 parts of pentaerythritol tetrastearate 6 parts of Luminova GLL-300FFS previously coated according to the invention with successively 2% of GE Silicones DF-581 (polydimethylsiloxane) and 2% of GE Silicones DF-1040 (polymethylhydrosiloxane).

The melt flow characteristics (melt volume rates) are summarized in Table 3. When the coating process described in this invention is used, it appears clearly that the resin compositions formed have relatively good melt stability for such an extremely high pigment loading (30%). This illustrates that when phosphorescent pigments are coated according to this invention, it is possible to make very stable pigment concentrates (masterbatches) that can be used directly to form an object (like for instance an extruded film or sheet) or can just be let down to form consistent resin compositions with a lower phosphorescent pigment content.

It must be noted that the nominal melt flow undergoes a relatively small shift of less than 3 units between a 6% loading of pigment (examples 2B and 2C) and 30% loading (examples 3A and 3B). With only 6% of non-coated pigment, a polycarbonate resin composition has a melt volume rate about 7 times higher than when a coated pigment is used at a 30% loading. This clearly indicates that coated pigments must be used to obtain high loading resin formulations that retain their physical properties.

TABLE 3

| Property | Units | Method | 3A | 3B |
|---|---|---|---|---|
| Melt Volume Rate, 300° C., 1.2 kgf, 2.54 cm, 6 min. | cm³/10 min | ASTM D 1238 | 8.22 | 7.28 |
| Melt Volume Rate, 300° C., 1.2 kgf, 2.54 cm, 18 min. | cm³/10 min | ASTM D 1238 | 9.87 | 8.40 |
| Melt Volume Rate shift (%) between 6 and 18 minutes | % | — | 20.0 | 15.4 |

What is claimed is:

1. A thermoplastic composition comprising at least one thermoplastic resin and a phosphorescent pigment with an aluminate matrix expressed by M—Al, in which M is at least one metal element selected from the group consisting of calcium, strontium and barium and Al represents an aluminate group, wherein the phosphorescent pigment is coated with a silicone oil.

2. The thermoplastic composition of claim 1 wherein the phosphorescent pigment is prepared by first coating with a first silicone oil and second coating with a different second silicone oil.

3. The thermoplastic composition of claim 2, wherein the phosphorescent pigment has a first coating comprising a hydrogen-alkyl siloxane oil and a second coating comprising a poly dialkyl siloxane oil.

4. The thermoplastic composition of claim 2, wherein the phosphorescent pigment has a first coating comprising poly dialkyl siloxane oil and a second coating comprising a hydrogen-alkyl siloxane oil.

5. The thermoplastic composition of claim 1 wherein the coating of the phosphorescent pigment is present in a quantity of about 0.05 to 20% by weight with respect to the phosphorescent pigment.

6. The thermoplastic composition of claim 1 comprising a polycarbonate resin or a blend of a polycarbonate resin with one or more other different thermoplastic resins.

7. The thermoplastic composition according to claim 1 wherein the aluminate has been doped with Europium.

8. The thermoplastic composition according to claim 1 wherein the aluminate has been doped with Europium and at least one co-dopant.

9. The thermoplastic composition according to claim 1 wherein colorants have been added to provide daylight color.

10. The thermoplastic composition of claim 1 comprising per 100 parts by weight of thermoplastic resin or resins 0.1–40 parts by weight of the phosphorescent pigment.

11. A concentrate suitable for the manufacture of the thermoplastic composition of claim 1, said concentrate comprising 5–50 parts by weight of the phosphorescent pigment per 100 parts by weight thermoplastic resin or resins.

12. The concentrate according to claim 11, wherein said concentrate comprises 15–35 parts by weight of the phosphorescent pigment per 100 parts by weight thermoplastic resin or resins.

13. A process for forming objects from the thermoplastic compositions claim 1 by injection molding.

14. Objects formed by injection molding of the thermoplastic composition of claim 1 or extrusion of the thermoplastic composition of claim 1.

15. The objects formed according to claim 16, wherein said objects are films or sheets.

16. Objects formed according to claim 14, wherein said objects are polycarbonate films or sheets.

* * * * *